(12) United States Patent
Ohshita et al.

(10) Patent No.: US 7,633,490 B2
(45) Date of Patent: Dec. 15, 2009

(54) INPUT DEVICE

(75) Inventors: Kazuhito Ohshita, Tokyo (JP); Akihisa Ito, Tokyo (JP); Yoshiyuki Kikuchi, Tokyo (JP); Kenji Watanabe, Tokyo (JP); Shoji Suzuki, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 497 days.

(21) Appl. No.: 11/552,800

(22) Filed: Oct. 25, 2006

(65) Prior Publication Data

US 2007/0097081 A1    May 3, 2007

(30) Foreign Application Priority Data

Oct. 28, 2005    (JP) .............................. 2005-314660

(51) Int. Cl.
*G09G 5/00* (2006.01)
(52) U.S. Cl. ..................... 345/168; 341/22; 379/433.07
(58) Field of Classification Search ................. 345/168, 345/169; 200/5 R, 342, 512; 361/679.21, 361/679.3, 679.08; 455/550.1, 566; 710/67, 710/316; 370/398; 379/433.07; 725/57; 341/22
See application file for complete search history.

(56) References Cited

U.S. PATENT DOCUMENTS 6,574,095 B2    6/2003  Suzuki
7,414,613 B2 *  8/2008  Simelius ...................... 345/168

* cited by examiner

*Primary Examiner*—Abbas I Abdulselam
(74) *Attorney, Agent, or Firm*—Brinks Hofer Gilson & Lione

(57) ABSTRACT

An input device is provided. The input device includes a key input unit having a plurality of input keys and an input operation unit. A key input monitor monitors a key input to the key input unit. A timer measures a setting time upon the key input. A relay driver is operative to acquire and output an operation signal output from the input operation unit as a control signal and monitor the operation signal. The key input monitor is operative to initiate the timer when the key input to the key input unit is detected and set the relay driver to an output inhibition state. The relay driver is operative to release the output inhibition state such that the control signal is normally output when it is detected that the operation signal is a predetermined operation input within the setting time.

10 Claims, 5 Drawing Sheets

INPUT DEVICE

This application claims the benefit of Japanese Patent Application No. 2005-314660 filed on Oct. 28, 2005, which is hereby incorporated by reference

BACKGROUND

1. Field

The present embodiments relate to an input device.

2. Related Art

Generally, in a notebook type computer, when a key input is performed by a keyboard, a style (touch typing manner) of placing both hands at a home position is used.

At this time, in the arrangement relationship between the keyboard and the touch pad, when the other finger or the palm of the hand touches the touch pad by mistake during the key input using the keyboard, unintended click or pointer movement is caused and thus an erroneous operation is performed.

As the prior art for preventing the erroneous operation and improving operability, for example, there is provided Patent Document 1.

In an input device disclosed in Patent Document 1, when a key input monitoring module 5 detects a key input from a keyboard 1, an input from a touch pad 3 is inhibited and a timer 6 is driven. When the key input is performed within a setting time (time value) T1 of the timer 6, the setting time T1 is updated and the time is measured again in the input inhibition state of the touch pad 3. In contrast, when the key input is not performed within the setting time T1, the input inhibition state of the touch pad 3 is released.

[Patent Document 1] Japanese Unexamined Patent Application Publication No. 2001-356869

However, in Patent Document 1, since the release of the input inhibition state of the touch pad is always controlled by the timer, the setting time T1 must necessarily elapse.

The setting time T1 is optionally set by an operator. However, the setting time T1 is too larger, the operator cannot smoothly perform transition to an input operation using the touch pad.

When the setting time T1 is too small, an erroneous operation is prone to be performed and unintended click or pointer movement is prone to be repeated to deteriorate operability.

SUMMARY

The present embodiments may obviate one or more of the limitations of the related art. For example, in one embodiment, an input device is capable of freely releasing an input inhibition state of a pointing device such as a touch pad and smoothly performing transition to an input operation using the pointing device even before a setting time elapses to prevent an erroneous operation and improve operability.

In one embodiment, an input device includes a key input unit having a plurality of input keys and an input operation unit. A key input monitor monitors a key input to the key input unit. A timer measures a setting time upon the key input. A relay driver is operative to acquire and output an operation signal output from the input operation unit as a control signal and monitor the operation signal. The key input monitor is operative to initiate the timer when the key input to the key input unit is detected and set the relay driver to an output inhibition state. The relay driver is operative to release the output inhibition state such that the control signal is normally output when it is detected that the operation signal is a predetermined operation input within the setting time.

An operator can perform a specific operation even when the input operation unit (pointing device) is in an input inhibition state so as to freely release the input inhibition state of the input operation unit. Accordingly, it is possible to smoothly perform an input operation.

When the key input is performed again within the setting time, the setting time may be updated and the time may be measured again in a state where the output inhibition state is maintained and, when the key input is not performed within the setting time, the output inhibition state may be released.

In one embodiment, it is possible to automatically set the maintenance and the release of the input inhibition state of the input operation unit by the key input within the setting time. Accordingly, it is possible to prevent an erroneous operation upon inputting.

The relay driver may include a calculation module which generates the control signal by performing at least a calculation process with respect to the operation signal and a monitoring module for the input operation unit, which monitors the operation signal and performs a predetermined process.

In this embodiment, since the calculation module calculates the operation signal and generates the predetermined control signal and the monitoring module monitors the contents of the control signal, it is possible to restrain the flow of a signal between the input operation unit and the control means as needed. For example, by restraining and transmitting the control signal (output inhibition state) to the controller, it is possible to set an input inhibition state where the operation of the input operation unit is not received. In the output inhibition state, the input inhibition state where the operation of the input operation unit is not received can be set by stopping the issue of the control signal.

The input operation unit may be either a pointing device or a game controller.

In another embodiment, an input device includes a controller and an input operation unit. A key input unit has a plurality of input keys. A timer measures an elapsed time after a key input. A relay device is operative to acquire and output an operation signal output from the input operation unit as a control signal and monitors the operation signal. A key input monitor is operative to set the control signal to an output inhibition state and drive the timer when the key input to the key input unit is detected. A display unit displays an input state from the key input unit and the input operation unit. When the output inhibition state is set, the relay device outputs a control signal that displays a specific display representing that the input from the input operation unit is inhibited on a screen of the display unit to the controller. When the output inhibition state is released, the relay device outputs a control signal that displays a specific display representing that the input from the input operation unit is allowed on the screen of the display unit to the controller.

In this embodiment, since the operator can recognize the input inhibition state, it is possible to provide an input device having more excellent operability.

The specific display may be displayed as an icon in a task bar.

In this embodiment, the operator can recognize the input inhibition state without interrupting the input operation.

According to one embodiment of the input device, an operator can perform a specific operation even in an input inhibition state where an input from a pointing device is inhibited after a key input to freely release the input inhibition state.

In one embodiment, since transition to an input operation can be performed even before a predetermined setting time elapses, it is possible to prevent an erroneous operation and to improve operability in the input device.

DETAILED DESCRIPTION

Figure 1:
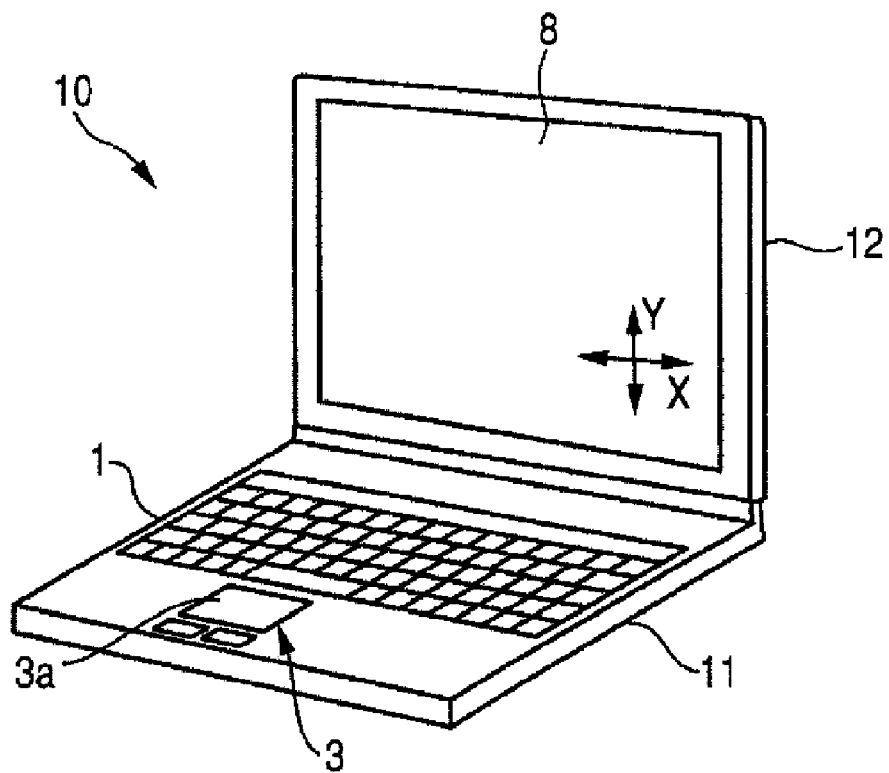
FIG. 1 is a perspective view showing a notebook type personal computer with a touch pad mounted as an input device.

In one embodiment, a notebook type personal computer (hereinafter, referred to as a "notebook type PC") 10 shown in FIG. 1 includes hardware such as a keyboard (key input unit) 1 for performing a key input, a touch pad (input operation unit) 3 and a display unit 8.

The keyboard 1 and the touch pad 3 are provided on a main body 11 at positions adjacent to each other. The display unit 8 is provided in a display casing 12 which is a cover.

Figure 3:
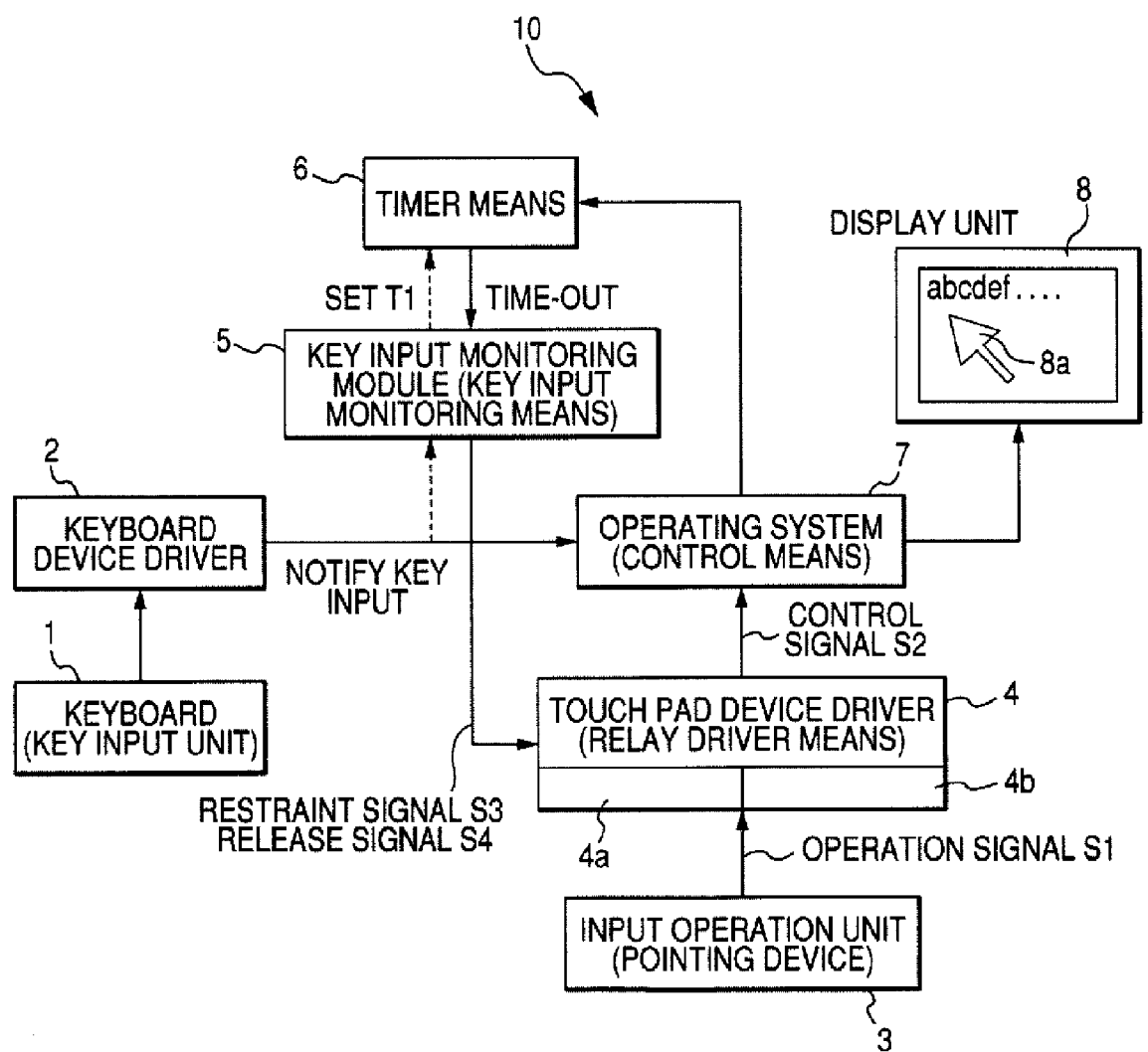
FIG. 3 is a block diagram showing one configuration of the input device.

As shown in FIG. 3, the notebook type PC 10 includes various kinds of software such as a keyboard device driver 2, a touch pad device driver (relay driver means) 4, a key input monitoring module (key input monitoring means) 5, timer means 6 and an operating system (control means) 7 which is fundamental means.

The keyboard 1 has a plurality of keys and keyboard switches for detecting the operations of the keys. The key inputs of the keyboard switches are supplied to the operating system 7 through the keyboard device driver 2 such that characters corresponding to the key inputs are displayed on the display unit 8.

Figure 4:
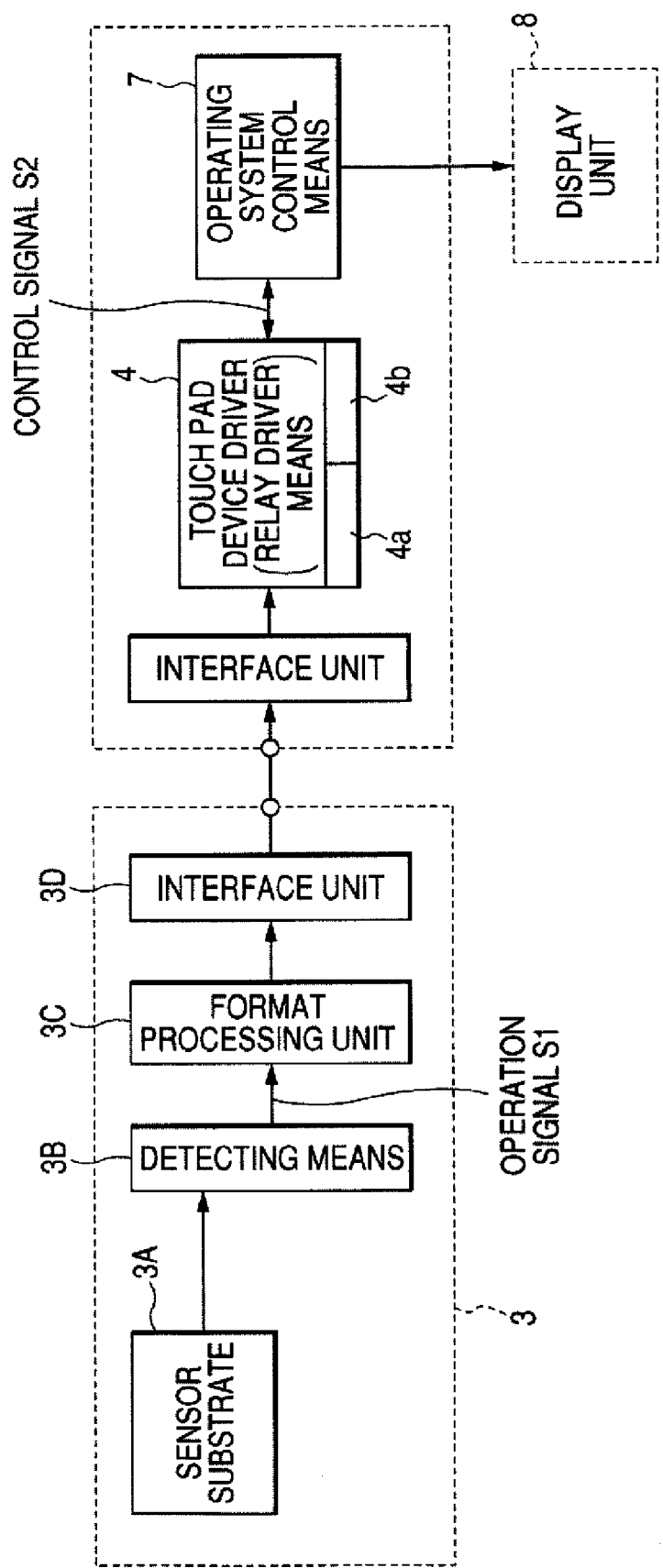
FIG. 4 is a circuit block diagram of the touch pad shown in FIG. 2.

As shown in FIG. 4, the touch pad 3 which is the input operation unit has an operation surface 3a and a sensor substrate 3A is provided below the operation surface 3a. The planar shape of the operation surface 3a is not specially limited. In the embodiment shown in FIGS. 1 and 2, the planar shape of the operation surface 3a is rectangular.

Figure 2:
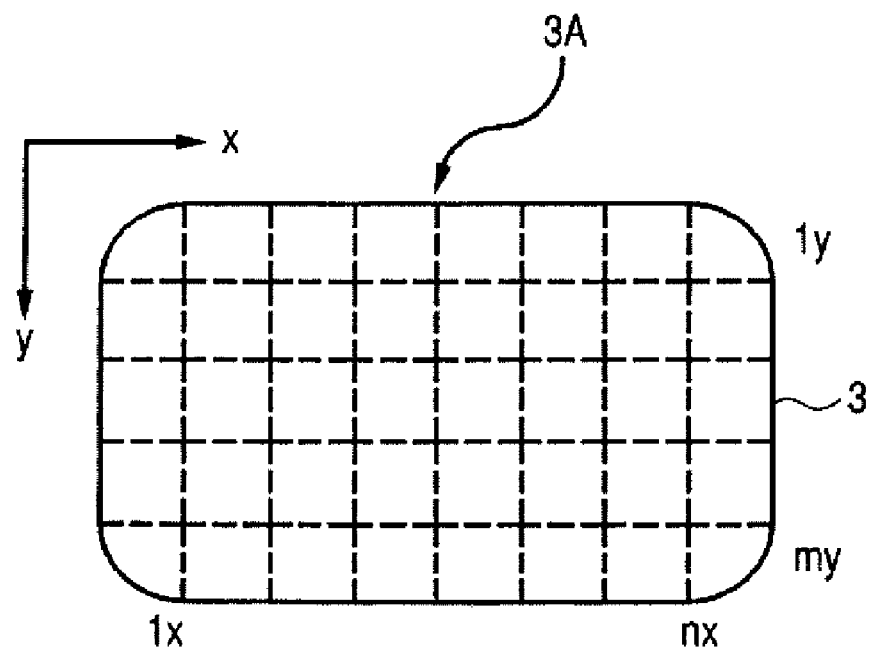
FIG. 2 is a partial enlarged plan view showing an operation surface of the touch pad as an input operation unit provided in the personal computer shown in FIG. 1.

As shown in FIG. 2, the sensor substrate 3A has a plurality of x electrodes 1x to nx which are arranged in parallel in a vertical direction with a predetermined pitch and a plurality of y electrodes 1y to my which are arranged in parallel in a horizontal direction with a predetermined pitch. The x electrodes 1x to nx and the y electrodes 1y to my face each other in a planar matrix and a dielectric having predetermined capacitance is formed between the both electrodes.

A detecting unit 3B serves to supply predetermined voltages between the x electrodes 1x to nx and the y electrodes 1y to my in a predetermined sequence and to acquire the capacitance between the electrodes.

When an operation body (for example, the finger of an operator or a touch pen) touches any position of the operation surface 3a, the capacitance between the x electrodes 1x to nx and the y electrodes 1y to my which are located just below the touch position is changed.

The detecting unit 3B transmits an operation signal S1 obtained by sampling the change in capacitance of each point in which each of the x electrodes 1x to nx and each of the y electrodes 1y to my cross each other in three dimensions with a predetermined time interval as a change in voltage between the electrodes to a format processing unit 3C.

The operation signal S1 sampled in the detecting unit 3B is converted into a predetermined format by the format processing unit 3C, which is then sent from an interface unit 3D to the touch pad device driver 4 in the notebook type PC 10 through an interface unit.

The touch pad device driver 4 includes various kinds of software such as a calculation module 4a or a pad monitoring module (monitoring module for the input operation unit) 4b. The operation module 4a is software for performing a predetermined calculation with respect to the operation signal S1 and generates and supplies a control signal S2 according to the operation signal S1 to the operating system (control means) 7 to perform the control for moving a pointer 8a on the display unit 8. The pad monitoring module 4b is software for monitoring the control signal S2 which is the output of the calculation module 4a as described below.

In one embodiment, the key input monitoring module 5 always monitors the key input from the keyboard 1. The key input monitoring module 5 outputs a restraint signal S3 for restraining the flow of the control signal S2 from the touch pad device driver 4 to the operating system (control means) 7 to the touch pad device driver (relay driver means) 4, when detecting the key input.

In one embodiment, the key input monitoring module 5 sets a specific setting time T1 of the timer (timer means) 6 using a service of the operating system 7. The timer 6 counts down in synchronization with the timer messages which are regularly sent from the operating system 7 to measure the setting time. The setting time T1 can be freely changed by the operator through a specific setting screen formed in a control panel on the screen.

When the key input from the keyboard 1 is performed again in a time period from when the touch pad input inhibition state is set to when the value of the timer 6 reaches 0 (time-out), the setting time T1 of the timer 6 is set again and the time of the touch pad input inhibition state extends. When the value of the timer 6 becomes 0 without extending the touch pad inhibition state, the previous touch pad input inhibition state is released and a general state where the operation of the touch pad 3 can be performed is set.

The touch pad device driver 4 restrains the flow of the control signal S2 from the touch pad device driver 4 to the operating system 7 (output inhibition state), when receiving the restraint signal S3. For example, the touch pad device driver 4 outputs the pseudo control signal S2 representing that the input from the touch pad 3 is not performed to the operating system 7. Accordingly, although the operation body touches the touch pad 3 by mistake when the key input from the keyboard 1 is performed, the information is not transmitted to the operating system (control means) 7 and an input inhibition state where the input from the touch pad is inhibited is actually set.

The pad monitoring module 4b in the touch pad device driver 4 monitors the operation signal S1 from the touch pad 3 even in the touch pad input inhibition state. When the predetermined operation signal S1 is detected, the pad monitoring module 4b releases the touch pad input inhibition state in the touch pad device driver 4 even before the value of the timer 6 becomes 0 (time-out) and the state where the operation of the touch pad 3 can be performed is set.

In one embodiment, the operation of the pad monitoring module 4b in the touch pad device driver 4, for example, a restraint releasing method for releasing the touch pad input inhibition state, will be described.

Figure 5:
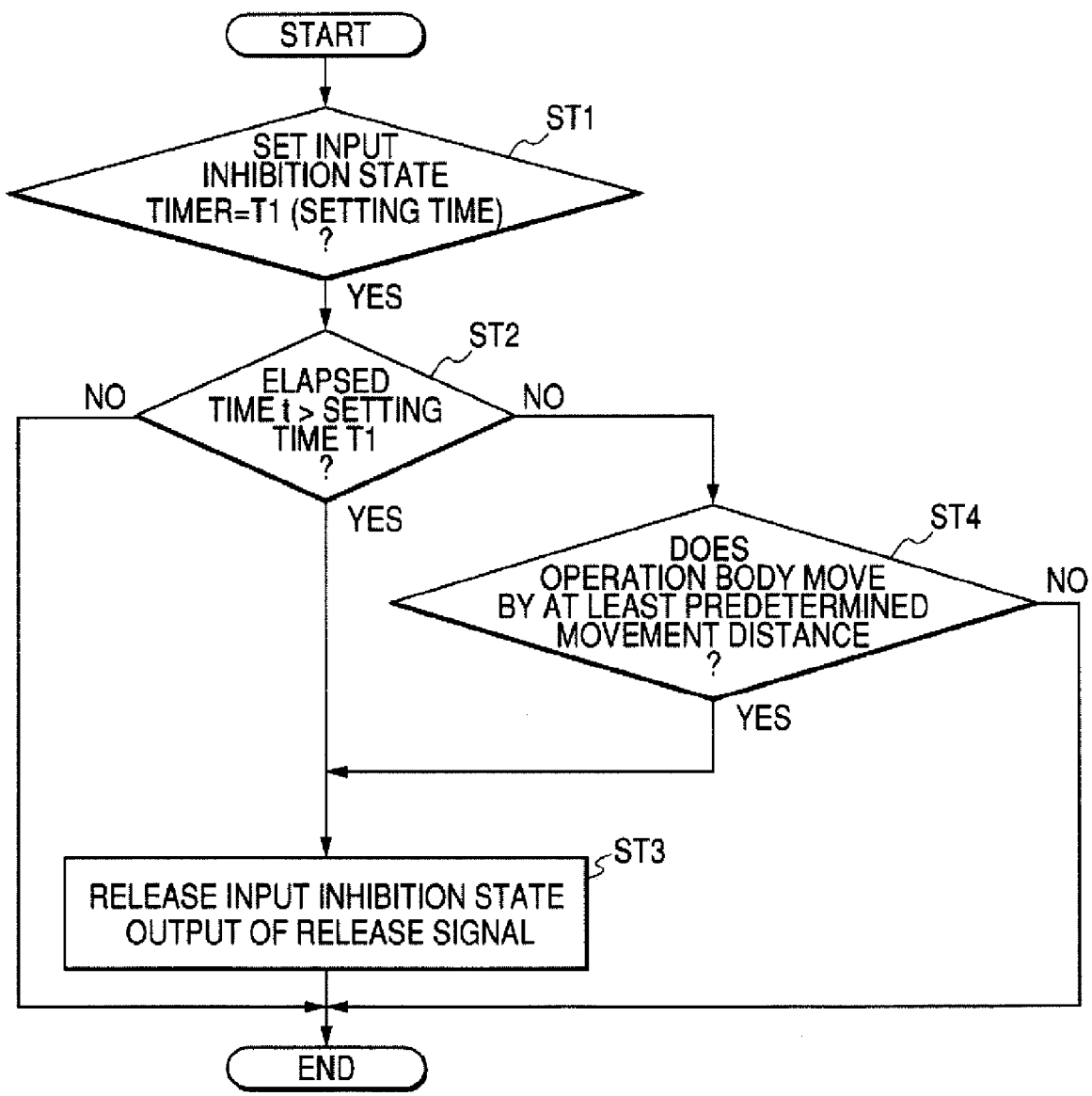
FIG. 5 is a flowchart showing a restraint releasing method for releasing a touch pad input inhibition state.

FIG. 5 is a flowchart showing the restraint releasing method for releasing the touch pad input inhibition state.

In one embodiment, when the restraint signal S3 is received from the key input monitoring module 5, the pad monitoring module 4b is executed with respect to the notification of the operation signal S1 (START) and the touch pad device driver 4 is set to an output inhibition state for restraining the flow of the control signal S2 from the touch pad 3 to the operating system 7, for example, the input inhibition state for inhibiting the input to the touch pad (ST1). At this time, a specific setting time T1 is set in the timer 6.

In act ST2, the elapsed time t of the timer 6 and the setting time T1 are compared. For example, the key input monitoring module 5 detects whether the elapsed time t after the key input is larger than the setting time T1 (time-out). If the elapsed time t>the setting time T1 (i.e. if time-out; if "yes"), the process progresses to act ST3.

In the act ST2, the key input monitoring module 5 determines whether the elapsed time t<setting time T1 (before time-out) if "no", the process progresses to act ST4.

In the act ST4, the pad monitoring module 4b which configures the touch pad device driver 4 monitors the operation signal S1 acquired by the calculation module 4a or the control signal S2 calculated from the calculation module 4a and performs the below-described predetermined process.

In FIG. 5, the pad monitoring module 4b detects whether the operation (operation input) of the operation body moves by at least a predetermined movement distance, from the operation signal S1 or the control signal S2. When it is determined that the operation body moves by the predetermined distance (if "yes"), the process progresses to the act ST3 and the touch pad input inhibition state is released.

The present embodiment is not limited to the act ST4, For example, the pad monitoring module 4b may monitor the movement speed of the operation body and monitor whether the speed having at least a predetermined value is maintained during at least a predetermined time and a case where the above-described condition is satisfied may correspond to the case of "yes" of the step ST4.

Alternatively, the position of the operation body may be monitored and a case where it is determined that a specific operation is performed with respect to a specific area (for example, four corners) on the operation surface 3a or a case where it is determined that a plurality of fingers are placed on the operation surface 3a (a plurality of operation inputs is detected) may correspond to the case of "yes" of the act ST4. The process may progress to the act ST3.

Since the pad monitoring module 4b simultaneously monitors a plurality of conditions, when at least two conditions are satisfied, for example, when the specific operation is performed with respect to the specific area on the operation surface 3a and at least two fingers are placed (a plurality of operation inputs is detected), the touch pad input inhibition state may be released.

The key input monitoring module monitors the key input from the keyboard 1 and, when a specific key input is performed, the input inhibition state may be released.

In the act ST3, the input inhibition state is released. At this time, the release signal S4 representing that the input inhibition state is released is output from the touch pad device driver 4 having the pad monitoring module 4b to the key input monitoring module or the operating system 7. The execution of the pad monitoring module 4b is completed (END) and the state where the general operation of the touch pad 3 can be performed is set.

In the act ST4, even when the pad monitoring module 4b determines that the movement distance of the operation body is less than the predetermined value (if "no"), the execution of the pad monitoring module 4b is completed (END). In this embodiment, the input inhibition state is maintained, and, when the operation signal S1 or the control signal S2 is acquired, the restraint releasing method for releasing the input inhibition state is executed from "START" as described above.

In one embodiment of the input device, when the restraint signal S3 is received from the key input monitoring module 5 and the pad monitoring module 4b is executed, the input from the touch pad 3 is inhibited between the input state inhibition (ST1) and the release of the input state inhibition (ST3), unless the above-described specific operation is performed.

In one embodiment, since it is difficult to determine whether the operation state of the input device which is being operated is in the input inhibition state of the touch pad 3, it is difficult for the operator who does not know such surroundings to perform the operation.

Figure 6A:
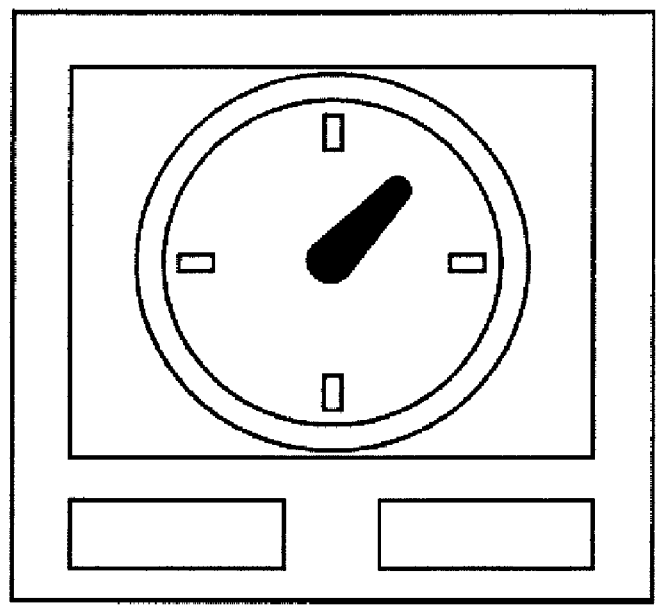
FIGS. 6A and 6B are views showing an example of a state display (icon) for displaying the input inhibition state.
Figure 6B:
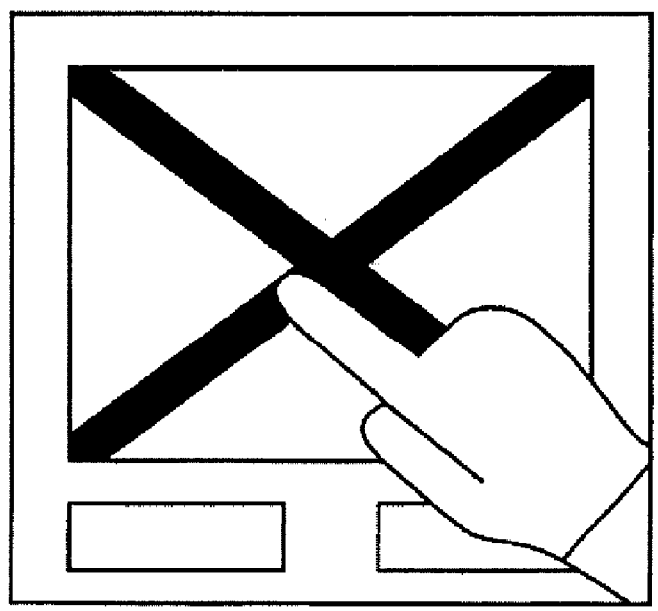

FIGS. 6A and 6B are views showing an example of a state display (icon) for displaying the input inhibition state.

In one embodiment, when the touch pad 3 is in the input inhibition state, the state display (icon) representing the input inhibition state shown in FIG. 6A or 6B is displayed on the display screen.

The state display shown in FIG. 6B includes a mark X and a finger mark, both of which are displayed on the display screen, and the state display shown in FIG. 6A includes an analog watch representing a state where the elapsed time t decreases. Accordingly, the operator can visually recognize that the input device is in the input inhibition state.

In one embodiment, these state displays can be realized using predetermined application software. In this embodiment, the inhibition state display is initiated when the key input monitoring module 5 outputs the restraint signal S3 and the transition from an inhibition state display to a general state display is performed when the release signal S4 is output to the operating system (control means) 7. By executing and stopping the application software representing the state display at such timings, operability can be improved.

The state display may be placed at any position on the screen of the display unit 8, and may be preferably placed at a position which is hard to interrupt the input operation. For example, the state display may be displayed as an icon in a task bar.

In one embodiment, the touch pad is used as an example of the input operation unit (pointing device), the present embodiments are not limited to the touch pad. The input operation unit may be a mouse, a trackball, a game controller or the like.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. An input device comprising:
a key input unit having a plurality of input keys;
an input operation unit;
a key input monitor which monitors a key input to the key input unit;
a timer which measures a setting time upon the key input; and a relay driver that is operative to acquire and output an operation signal output from the input operation unit as a control signal and monitor the operation signal, wherein the key input monitor is operative to initiate the timer when the key input to the key input unit is detected and set the relay driver to an output inhibition state, and wherein the relay driver is operative to release the output inhibition state such that the control signal is normally output when it is detected that the operation signal is a predetermined operation input within the setting time.

2. The input device according to claim 1, wherein the key input is performed again within the setting time, and the setting time is updated and the time is measured again in a state where the output inhibition state is maintained.

3. The input device according to claim 1, wherein the relay driver includes a calculation module which generates the control signal by performing at least a calculation process with respect to the operation signal and a monitoring module for the input operation unit, which monitors the operation signal and performs a predetermined process.

4. The input device according to claim 1, wherein the input operation unit is either a pointing device or a game controller.

5. The input device according to claim 1, wherein the input operation unit is provided in the vicinity of the key input unit.

6. The input device according to claim 1, wherein the output of the control signal is restrained while the input of the operation signal is maintained.

7. The input device according to claim 1, wherein when the key input is not performed within the setting time, the output inhibition state is released.

8. An input device comprising:
a controller;
a key input unit having a plurality of input keys;
an input operation unit;
a timer which measures an elapsed time after a key input;
a relay device which is operative to acquire and output an operation signal output from the input operation unit as a control signal and monitors the operation signal;
a key input monitor which is operative to set the control signal to an output inhibition state and drive the timer when the key input to the key input unit is detected; and
a display unit which displays an input state from the key input unit and the input operation unit, wherein, when the output inhibition state is set, the relay device outputs a control signal that displays a specific display representing that the input from the input operation unit is inhibited on a screen of the display unit to the controller, and wherein, when the output inhibition state is released, the relay device outputs a control signal that displays a specific display representing that the input from the input operation unit is allowed on the screen of the display unit to the controller.

9. The input device according to claim 8, wherein the specific display is displayed as an icon in a task bar.

10. The input device according to claim 8, wherein the input operation unit is provided in the vicinity of the key input unit.

* * * * *

UNITED STATES PATENT AND TRADEMARK OFFICE
CERTIFICATE OF CORRECTION

PATENT NO. : 7,633,490 B2
APPLICATION NO. : 11/552800
DATED : December 15, 2009
INVENTOR(S) : Ohshita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this

Ninth Day of November, 2010

David J. Kappos
*Director of the United States Patent and Trademark Office*